US006424660B2

(12) United States Patent
Jacobson, Jr.

(10) Patent No.: US 6,424,660 B2
(45) **Date of Patent: *Jul. 23, 2002**

(54) ADDRESSABLE DISTRIBUTED WIRELESS REMOTE CONTROL SYSTEM

(75) Inventor: James E. Jacobson, Jr., West Linn, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,738

(22) Filed: Oct. 10, 1997

(51) Int. Cl.[7] .................................................. H04Q 7/06

(52) U.S. Cl. .................... 370/475; 340/3.5; 340/825.72

(58) Field of Search ....................... 340/825.06, 825.07, 340/825.72, 3.5, 3.53, 3.54; 370/475

(56) References Cited

U.S. PATENT DOCUMENTS 4,173,754 A 11/1979 Feiker
4,200,862 A 4/1980 Campbell et al.
4,275,385 A 6/1981 White
4,352,992 A 10/1982 Buennagel et al.
4,371,814 A 2/1983 Hannas
4,885,803 A 12/1989 Hermann et al.
4,916,642 A 4/1990 Kaiser et al.
5,109,222 A * 4/1992 Welty .................... 340/825.72
5,160,924 A 11/1992 Jean-Pierre et al.
5,182,552 A 1/1993 Paynting
5,297,211 A 3/1994 Noro
5,321,542 A * 6/1994 Freitas et al. ............... 359/172
5,387,993 A 2/1995 Heller et al.
5,440,301 A 8/1995 Evans
5,537,104 A * 7/1996 Van Dort et al. ....... 340/825.52
5,565,855 A * 10/1996 Knibbe .................. 340/825.06
5,654,985 A * 8/1997 Crayford et al. ............ 375/211
5,739,760 A * 4/1998 Hatakeyama .......... 340/825.15
5,887,029 A * 3/1999 Husted et al. .............. 375/224

OTHER PUBLICATIONS

FAQ section 1: General Information on the X10 Communications Protocol—Microsoft Internet Explorer; http://web.cs.ualberta.ca/∫wade/HyperHome/Faq/faq_section1.html, 17 pages (printed Dec. 12, 1996).
FAQ section 2: Information on X10 Components—Microsoft Internet Explorer; http://web.cs.ualberta.ca/∫wade/HyperHome/Faq/faq_section2.html, 6 pages (printed Dec. 12, 1996).
FAQ section 3: Details on X10 Protocol—Microsoft Internet Explorer; http://web.cs.ualberta.ca/∫wade/HyperHome/Faq/faq_section3.html, 3 pages (printed Dec. 12, 1996).
FAQ section 4: Programming details for CP290 Home Control Interface—Microsoft Internet Explorer; http://web.cs.ualberta.ca/∫wade/HyperHome/Faq/faq_section4.html; 8 pages (printed Dec. 12, 1996).
FAQ section 5: Modifications to X10 Hardware—Microsoft Internet Explorer; http://web.cs.ualberta.ca/∫wade/HyperHome/Faq/faq_section5.html; 11 pages (printed Dec. 12, 1996).

* cited by examiner

*Primary Examiner*—Melvin Marcelo
(74) *Attorney, Agent, or Firm*—Blakely, Sokoloff, Taylor & Zafman LLP

(57) ABSTRACT

An apparatus for use in an addressable distributed wireless remote control system includes a receiver operative to receive a request from an unidentified remote control device via a wireless communication medium. The apparatus also includes a storage device to store an identifier which identifies the receiver in the system, and transmit logic, coupled to the receiver and the storage medium, operative to transmit both the request and the identifier to a system controller.

21 Claims, 6 Drawing Sheets

ADDRESSABLE DISTRIBUTED WIRELESS REMOTE CONTROL SYSTEM

BACKGROUND OF THE INVENTION

1. Field of the Invention

The present invention pertains to the field of control systems. More particularly, this invention relates to distributed wireless remote control systems.

2. Background

The use of infrared (IR) remote controls has become commonplace in the electronics industry, particularly in the home electronics market. Conventional IR remote controls are typically linked to one or possibly a few specific components within the home. By way of example, a typical remote control may control an audio receiver/amplifier and compact disk (CD) player in one room of a house. Another typical remote control may control a television, a video cassette recorder (VCR), and a cable box in that same room, while yet another remote control controls a television and cable box in another room of the house. Due to the tying of remote controls to specific components, these multiple remotes are typically not interchangeable. Therefore, it can be seen that this approach creates many problems, including requiring users to maintain several different remote controls in different rooms of their home, as well as requiring users to remember which remote control(s) works with which components in which rooms of their home.

Thus, what is needed is a more generic approach to remote controls. That is, rather than having a different remote control for each component in an individual's home, it would be beneficial to provide a way for fewer remote controls to control the components in multiple rooms of the home.

Therefore, a need exists for an addressable distributed wireless remote control system.

SUMMARY OF THE INVENTION

According to one embodiment of the present invention, an apparatus for use in a system includes a receiver operative to receive a request from an unidentified remote control device via a wireless communication medium. The apparatus also includes a storage medium to store an identifier which identifies the receiver in the system, and transmit logic, coupled to the receiver and the storage medium, operative to transmit both the request and the identifier to a system controller.

According to one embodiment of the present invention, an apparatus for use in a system includes a receiver to receive both a request and an identifier of a device from the device in the system. The apparatus also includes transmit logic to transmit commands to one or more components of the system and a storage medium to store a correspondence between the identifier and the one or more components. The apparatus also includes control logic, coupled to the receiver, the transmit logic, and the storage medium, to identify a component of the one or more components of the system based on the identifier of the device and to control the transmit logic to transmit a command corresponding to the request to the identified component.

According to one embodiment of the present invention, a request and an identifier of a receiver of the request are received from the receiver. A command is then issued corresponding to the request to a component based on the identifier of the receiver.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Figure 1:
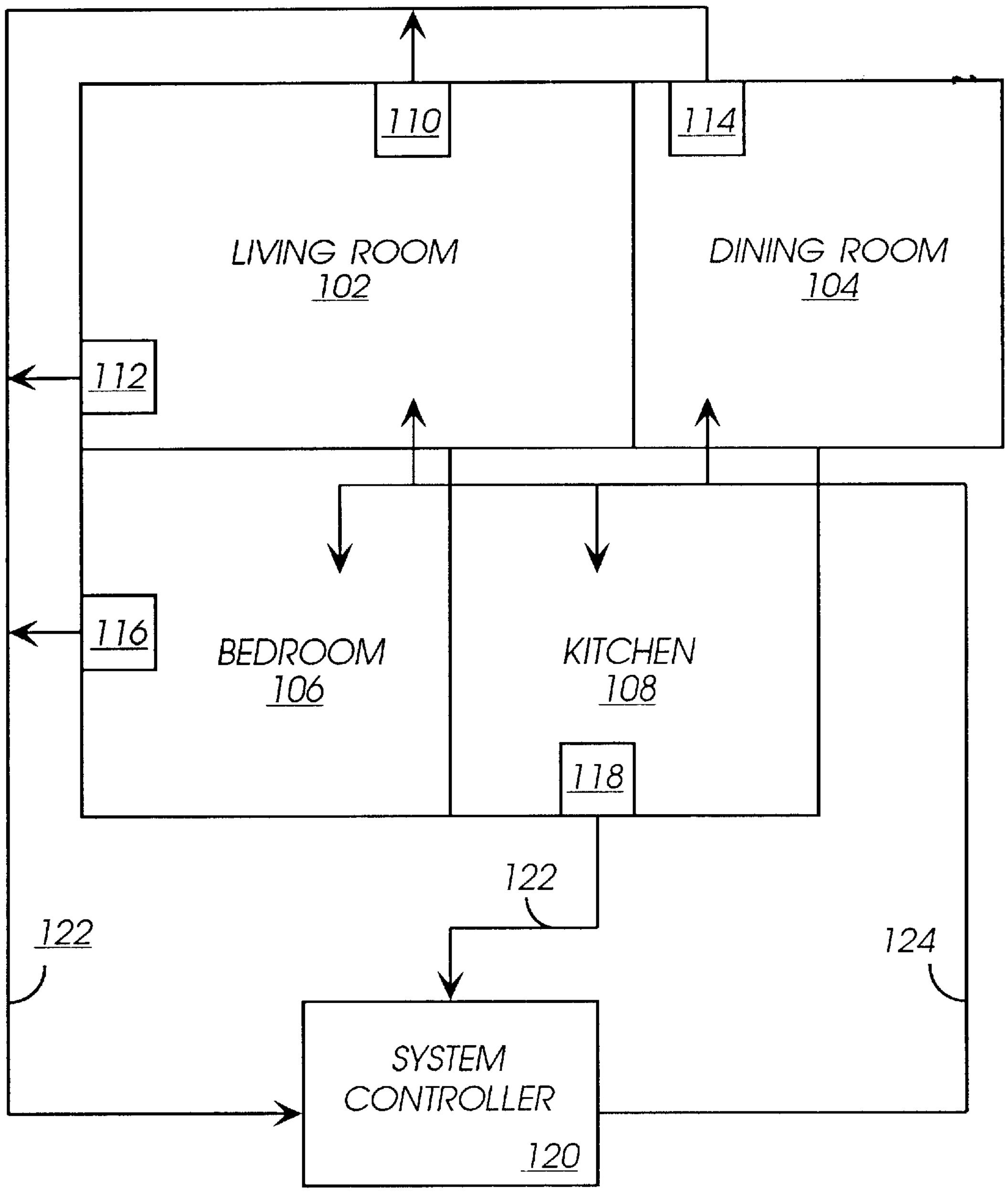
FIG. 1 is a block diagram illustrating an example environment in which the present invention can be practiced.

FIG. 1 is a block diagram illustrating an example environment in which the present invention can be practiced. FIG. 1 illustrates multiple rooms of a residence, including a living room 102, dining room 104, bedroom 106, and kitchen 108. It is to be appreciated that FIG. 1 is merely an example environment and that the present invention can be used in virtually any structure. Wireless reception devices 110, 112, 114, 116, and 118 are distributed throughout the multiple rooms as illustrated. Each of the wireless reception devices 110, 112, 114, 116 and 118 receives requests from a remote control device and sends both the received request and an identifier of the reception device to a system controller 120 via communication lines 122. System controller 120 interprets the request and decides whether to activate, deactivate, or leave unchanged various functions of various electrical components in rooms 102, 104, 106, and 108. Which functions of which components in which rooms are activated or deactivated depends on both the request, the room in which the request occurred, and possibly additional factors as discussed in more detail below.

It is to be appreciated that a wide variety of electrical components can be controlled by system controller 120 in accordance with the present invention. By way of example, these components can include audio components such as receivers, amplifiers, tuners, compact disk (CD) players, and audio cassette players, video components such as video cassette recorders (VCRs), DVD recorders/players (DVD is currently used as an acronym for digital video disk; however, it appears that the usage is being changed to digital versatile disk to reflect the ability of DVD technology to be used for data other than video), laser disk players, televisions, video cameras, digital cameras, cable boxes, and satellite boxes for use with satellite dish systems. Additionally, components of a non-audio/video nature can also be controlled, such as lighting systems, automatic window coverings (e.g., blinds or shades), heating and/or cooling systems, security systems, etc.

Figure 2:
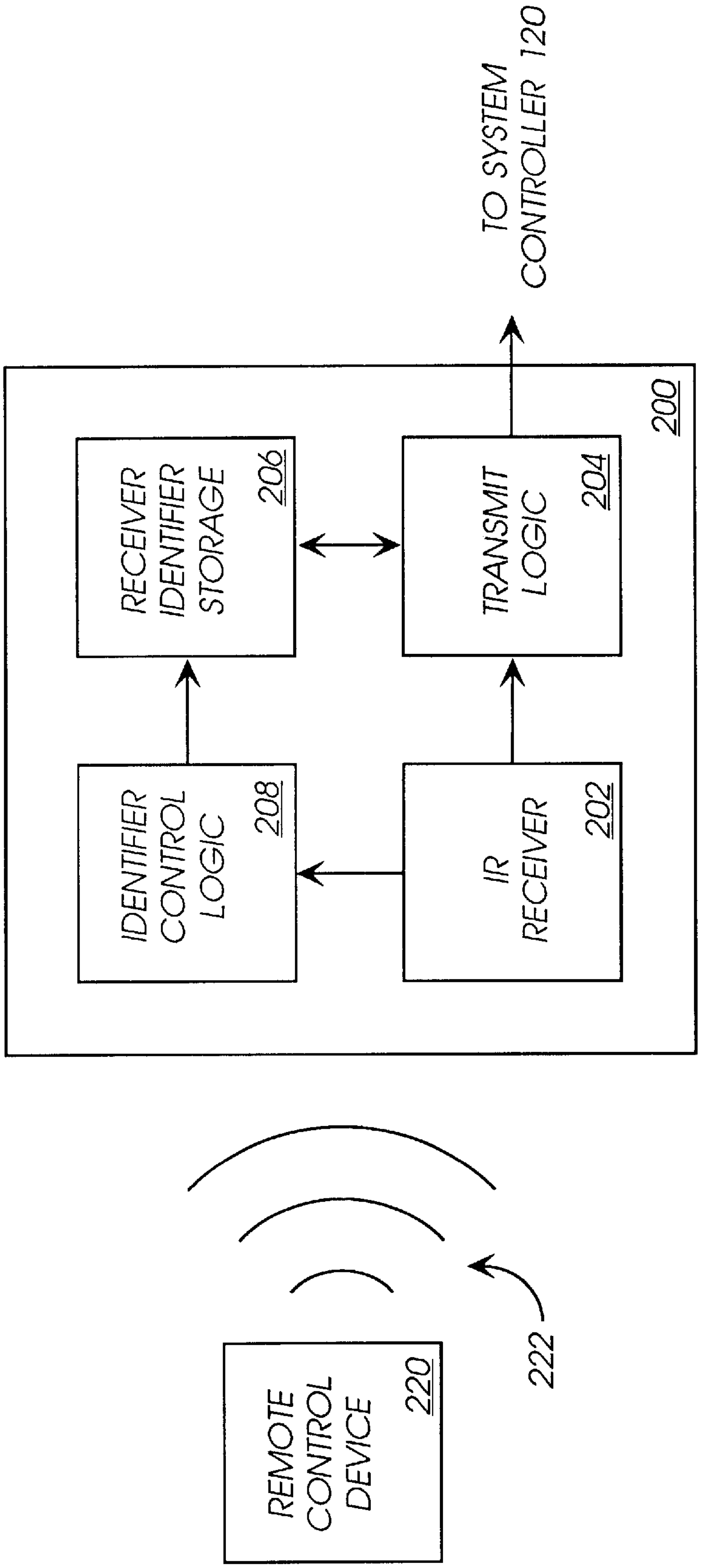
FIG. 2 is a block diagram illustrating a wireless reception device according to one embodiment of the present invention.

FIG. 2 is a block diagram illustrating a wireless reception device according to one embodiment of the present invention. Reception device 200 as illustrated includes infrared (IR) receiver 202, transmit logic 204, receiver identifier storage medium 206, and identifier control logic 208. In the illustrated embodiment, each of the reception devices 110, 112, 114, 116, and 118 of FIG. 1 is a reception device 200.

IR receiver 202 receives infrared signals 222 from a remote control device 220. Remote control device 220 is activated by a user (not shown) and provides a wide range of conventional functions for the user's selection, such as power on/off, channel or station up/down, volume up/down, component selection inputs (e.g., VCR, CD player, tuner/amplifier, television, speaker A/B, etc.). Any one of these functions can be requested by the user by selecting the proper button on remote control device 220. When a particular function is requested by a user, remote control device 220 transmits an IR signal 222 which identifies the request. This identification is typically a command code encoded into IR signal 222. IR signal 222 also includes a target address which identifies the intended target of the request. In the illustrated embodiment, reception device 200 is the target of the request rather than another component (such as a television or audio/video receiver). IR receiver 202 of the reception device 200 which is within range of remote control device 220 receives IR signal 222. IR receiver 202 receives IR signal 222 and extracts the command code from IR signal 222. The generation and transmission of an IR signal including a command code as well as extracting that command code from the IR signal is well known to those skilled in the art and thus will not be discussed further except as it pertains to the present invention.

It is to be appreciated that although the present invention is discussed as transmitting and receiving IR signals, any type of wireless communication media can be used with the present invention. By way of example, remote control device 220 can, in alternate embodiments, transmit signals to reception device 200 via ultrasonic or radio frequency (RF) signals.

Upon reception and extraction of a code, IR receiver 202 forwards the code to transmit logic 204. Transmit logic 204 accesses receiver identifier storage medium 206 for the identifier, also referred to as the address, of reception device 200. Transmit logic 204 then transmits both the receiver identifier as well as the received command code to system controller 120 via communication lines 122. It is to be appreciated that communication lines 122 represent a broad range of conventional communication media, including both wired and wireless media. Thus, system controller 120 receives both the requested command code as well as an identifier of the receiver which received the request.

Each reception device 200 is programmed with a receiver identifier in identifier storage medium 206. In one embodiment, each receiver identifier is unique, thereby allowing system controller 120 to identify exactly which reception device received the request from remote control device 220. In an alternate embodiment, multiple reception devices may share the same receiver identifier, thereby allowing system controller 120 to identify a set of reception devices, one of which received the request from remote control device 220. Having multiple devices share the same receiver identifier can be useful, for example, in situations where a room is large enough that multiple reception devices 200 are used to provide adequate reception from any point in the room, such as devices 110 and 112 in room 102 of FIG. 1. Thus, in this example, system controller 120 can identify which location or room a request came from even though it cannot identify exactly which reception device received the request.

Storage medium 206 can be any of a wide variety of storage mediums, including both nonvolatile and volatile mediums. By way of example, storage medium 206 can be a Flash memory device, another type of programmable read only memory (PROM), dynamic random access memory (DRAM), static random access memory (SRAM), etc. In one implementation, if storage medium 206 is a volatile memory, the necessary power to the memory is maintained by a direct current (DC) or alternating current (AC) power source supplied to reception device 200. Additionally, other mechanisms may be used to "store" the identifier, such as jumper or dip switch settings.

In one embodiment, receiver identifier storage medium 206 is pre-programmed with the identifier of reception device 200. In an alternate embodiment, storage medium 206 is user-programmed.

Identifier control logic 208 provides control logic which allows the identifier in storage medium 206 to be altered by a user. In one embodiment, reception device 200 includes a user interface, such as a numeric or alphanumeric keypad, which allows a user to input a specific numeric or alphanumeric identifier. Confirmation of an entry or display of the programmed identifier could be, for example, via a liquid crystal diode (LCD) display, a light emitting diode (LED) display, one or more colored LEDs to flash indications of proper or improper entries, etc. According to another embodiment of the present invention, receiver identifier storage medium 206 is programmable via remote control device 220. In this embodiment, selection of a "program device" key or option (not shown) on remote control device 220 causes IR receiver 202 to transmit subsequent signals from remote control device 220 to identifier control logic 208 rather than transmit logic 204. Thus, the user can enter a particular identifier to be stored in storage medium 206 via remote control device 220. In one implementation, IR receiver 202 continues to forward control codes of signals from remote control device 220 to identifier control logic 208 until the "program device" key is again selected, or alternatively for a predetermined period of time.

It is also to be appreciated that, rather than having a user program in specific identifiers, such program could be done automatically by remote control device 220. By way of example, a user could select a "program device" key on remote control device 220 which causes device 220 to enter a "program" mode. In program mode, remote control device 220 transmits a "program" code indicating to IR receiver 202 that subsequent signals are intended for identifier control logic 208 rather than transmit logic 204. Then, selection of an increment key (e.g., a channel up key) while still in "program" mode causes remote control device 200 to transmit the program code followed by a predetermined identifier which is different than the previously transmitted identifier (e.g., incremented by one) to whatever reception device(s) 200 is within range. Thus, by going from room to room and pressing the increment key, the different reception devices 200 in those rooms can be automatically programmed with different identifiers by remote control device 220 without requiring a user to enter the specific identifiers. Remote control device 220 can be taken out of such a "program" mode by the user again pressing the "program device" code.

Figure 3:
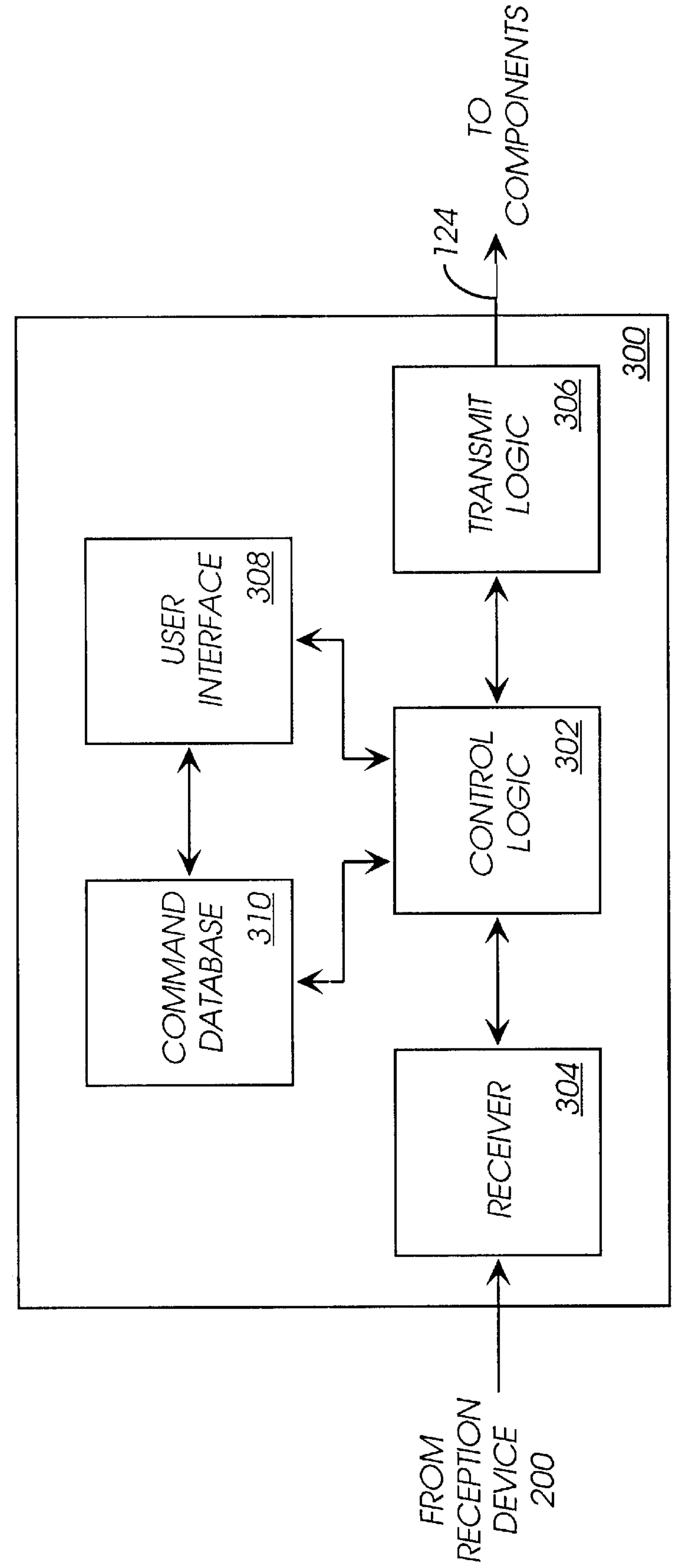
FIG. 3 is a block diagram of a system controller according to one embodiment of the present invention.

FIG. 3 is a block diagram of a system controller according to one embodiment of the present invention. In the illustrated embodiment, system controller 120 of FIG. 1 is a system controller 300 of FIG. 3. As illustrated, system controller 300 includes control logic 302, receiver 304, transmit logic 306, user interface 308, and command database 310. It is to be appreciated that command database 310 can be stored on any of a wide variety of conventional storage media.

Receiver 304 receives signals from reception device 200. As discussed above, these signals include both a command code identifying the requested function as well as the identifier of the reception device which received the request. Receiver 304 forwards these commands and identifiers to control logic 302, thereby indicating to control logic 302 the user's request as well as the location in which the request was made (e.g., the room in which the request was made). In one embodiment, control logic 302 also accesses command database 310 to identify which commands, if any, to give to which components based on the location of the request. Additional verification of whether the request should be carried out can also be made by accessing command database 310, as discussed in more detail below.

When control logic 302 determines that one or more commands are to be transmitted to one or more components in response to the received request, control logic 302 forwards the commands to transmit logic 306 which transmits the appropriate command(s) to the appropriate component (s). In one embodiment, individual components in individual rooms are coupled to transmit logic 306 via communication line 124 of FIG. 1. Each of the components is individually addressable, thereby allowing system controller 300 to identify particular ones of these components. It is to be appreciated that communication line 124 can be any type of communication link, including a network cable (e.g., a twisted pair, coaxial cable, or fiber optic cable), a conventional bus (e.g., Universal Serial Bus) or the electrical wiring already used in the residence (e.g., using X-10 products, available from X-10 (USA) Inc. of Closter, N.J.). Alternatively, communication line 124 could be a wireless connection, such as via ultrasonic or RF signals. Activation and deactivation of particular functions of multiple components from a system controller is well known to those skilled in the art and thus will not be discussed further except as it pertains to the present invention.

Command database 310 maintains one or more records identifying which actions, if any, are to be carried out by system controller 300 based on the received command. In one embodiment of the present invention, command database 310 identifies actions based on the receiver identifier received along with the command code from reception device 200. In one implementation, the actions in command database 310 are arranged by receiver identifier. In this implementation, control logic 302 searches command database 310 to find a record(s) which has the same receiver identifier and command code as that received from reception device 200. In another implementation, control logic 302 accesses a location database (not shown) to identify a location which corresponds to the receiver identifier (e.g., living room or bedroom), and then control logic 302 searches command database 310 to find a record(s) which has the same command code as that received from reception device 200 and the location identified by the location database.

In one embodiment, command database 310 is user-programmable, allowing individual users to store in database 310 the actions they would like to have occur given a particular request in a particular room. It is to be appreciated that some or all of these actions can also be pre-programmed in command database 310. User interface 308 provides an interface for a user to modify command database 310. In one embodiment, user interface 308 is a graphical user interface (GUI). In alternate embodiments, user interface 308 is a numeric or alphanumeric input with LCD or LED displays.

A wide range of commands can be stored in command database 310. It is to be appreciated that the exact commands stored in command database 310 is dependent on the functions the various components coupled to controller 300 are capable of carrying out. By way of example, a simple connection between received command and component can be maintained. In this example, command database 310 can indicate that when a request to turn on the television is received in a particular room, a power on command is to be sent to the television located in that room. Similarly, when a speaker volume up request is received, command database 310 can indicate that a speaker volume increase command is to be sent to the television located in that room.

More complex connections can also be maintained in command database 310. For example, command database 310 can indicate that when a request to turn on the television is received in a particular room, the lights are also to be dimmed in that same room. Similarly, command database 310 can also indicate that the window coverings in that room are to be closed.

Correspondence between commands in one location and actions in other locations can also be maintained. By way of example, command database 310 can indicate that when a request to turn on the television in the living room is received, the television in the living room is to be turned on and the television in the bedroom is to be turned off, and the lights in the kitchen, bedroom, and dining room are also to be turned off.

Additional qualification of commands can also be maintained in command database 310. By way of example, command database 310 can indicate that requests to turn on the television in a particular bedroom (for example, a child's room) are only to be carried out between 4:00 p.m. and 7:00 p.m., and otherwise are to be ignored. In embodiments where additional qualification of commands is performed, control logic 302 verifies that the qualification(s) is satisfied before forwarding a command(s) to transmit logic 306. In embodiments where qualifications are time based, system controller 300 includes a clock (not shown) in order for control logic 302 to ascertain the time of a particular request.

Figure 4:
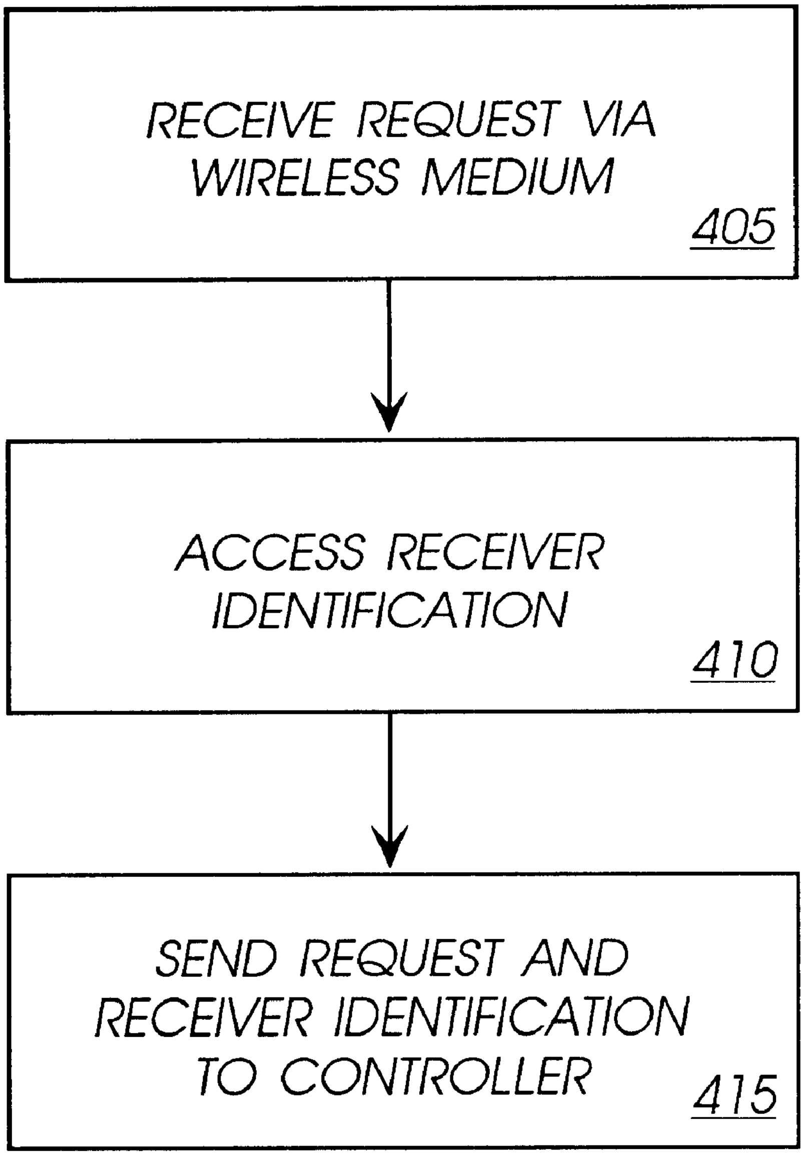
FIG. 4 is a flowchart illustrating the steps followed by a reception device according to one embodiment of the present invention.

FIG. 4 is a flowchart illustrating the steps followed by a reception device according to one embodiment of the present invention. Reception device 200 first receives a request via a wireless medium, step 405. Upon receipt of the request, reception device 200 accesses its receiver identification, step 410. Reception device 200 then sends the request and the receiver identification to the system controller, step 415.

Figure 5:
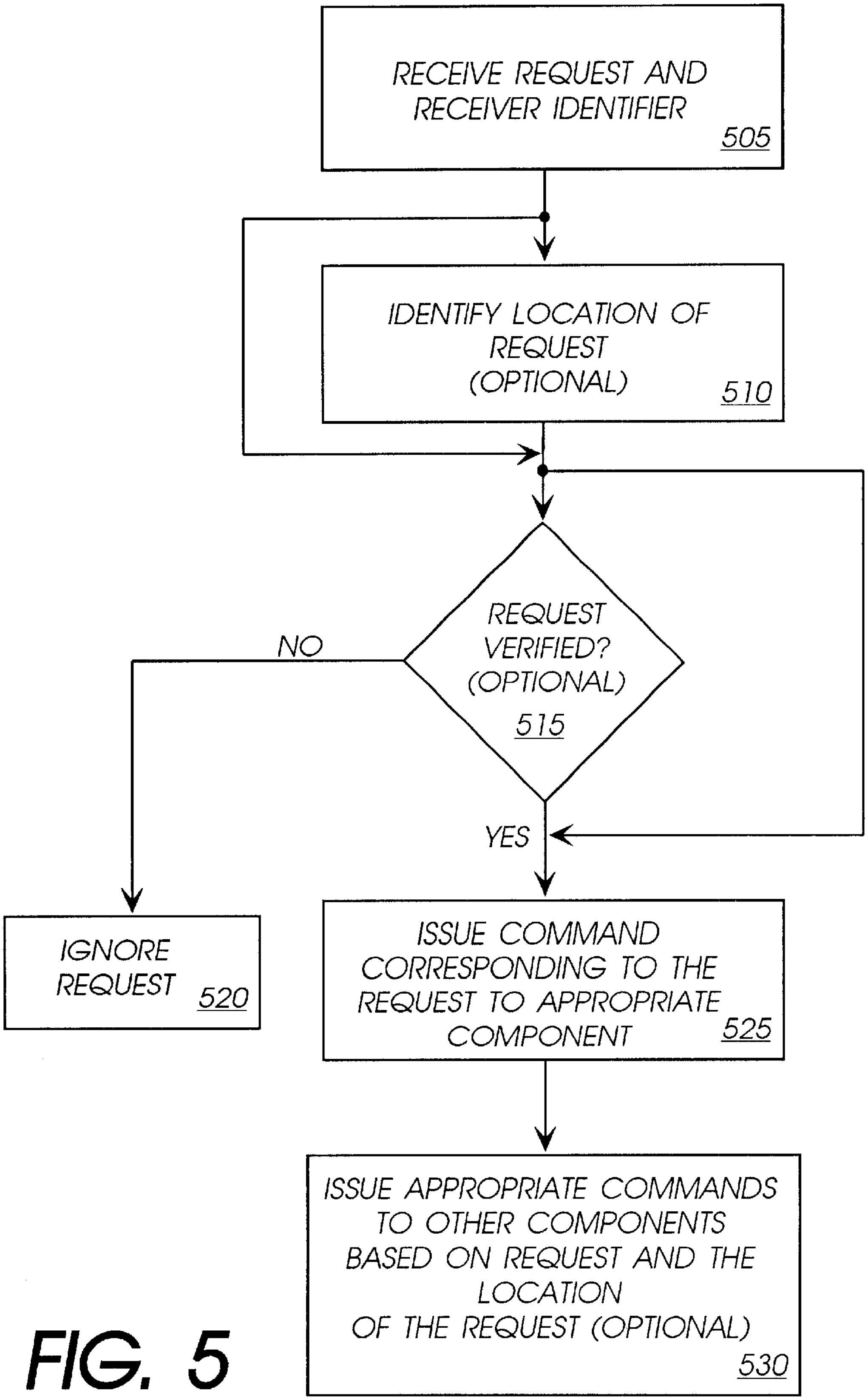
FIG. 5 is a flowchart illustrating the steps followed by a system controller according to one embodiment of the present invention.

FIG. 5 is a flowchart illustrating the steps followed by a system controller according to one embodiment of the present invention. System controller 120 first receives a request and a receiver identifier from a reception device, step 505. System controller 120 then optionally identifies the location of the request, step 510. As discussed above, system controller 120 can use either the receiver identifier itself to check which actions are to be performed, in which case step 510 is not necessary. Alternatively, the receiver identifier can be used to lookup the location (e.g., bedroom, living room, etc.) of the reception device, in which case step 510 is performed.

Once the location is identified, system controller 120 optionally checks whether the request is verified, step 515. Verification checking step 515 includes verifying that the qualifications for the request, if any, have been satisfied. If the request is not verified, then it is ignored, step 520. However, if the request is verified, then system controller 120 issues the command corresponding to the request to the appropriate component in the identified location, step 525.

System controller 530 optionally issues additional commands to other components based on the request and the location of the request, step 530. These additional commands include, for example, powering off other components or dimming lights in the same location as the request or in different locations.

Figure 6:
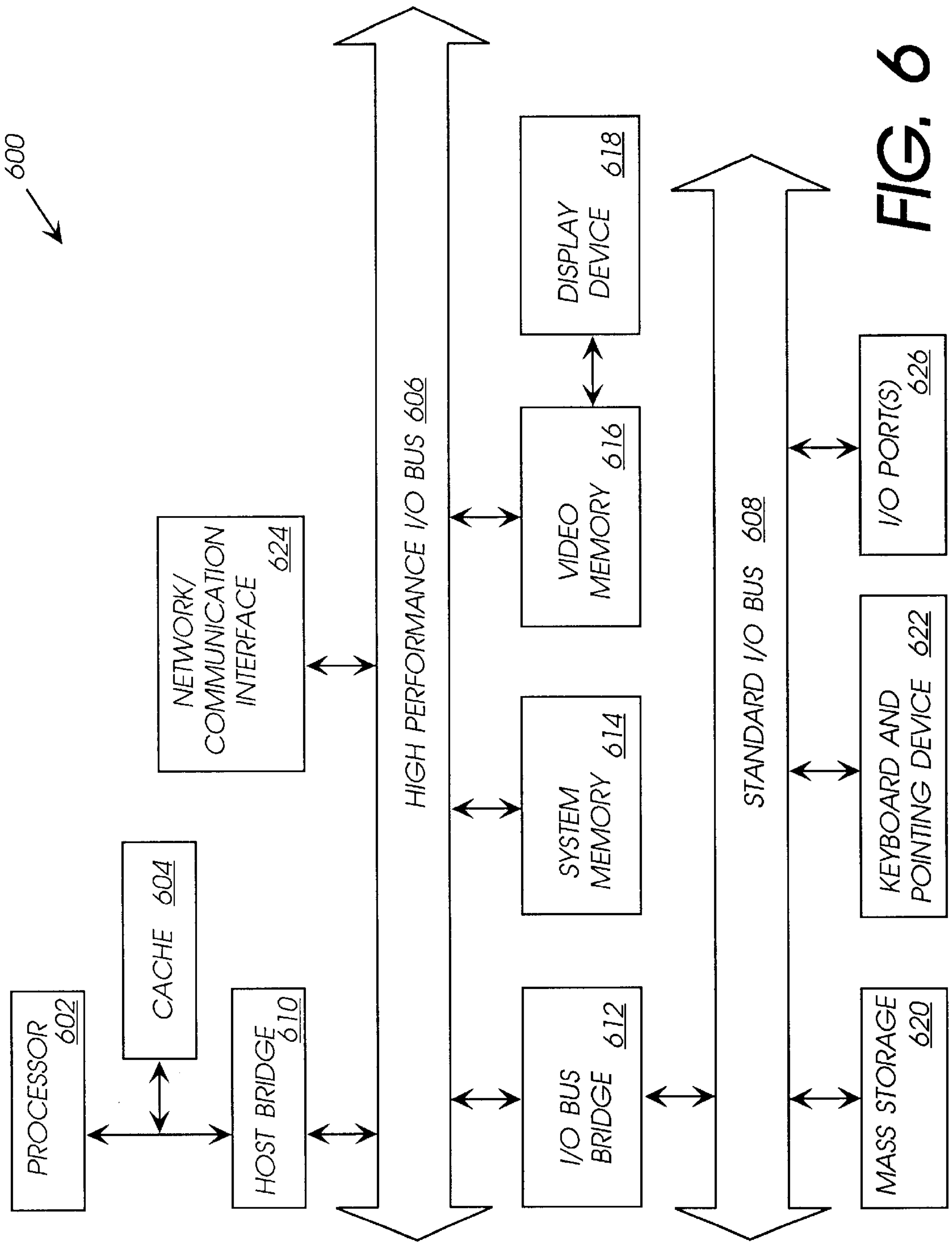
FIG. 6 illustrates one embodiment of a hardware system suitable for use with the present invention.

FIG. 6 illustrates one embodiment of a hardware system suitable for use with the present invention. In one embodiment, system controller 300 illustrated in FIG. 3 is a hardware system 600 of FIG. 6. In the illustrated embodiment, hardware system 600 includes processor 602 and cache memory 604 coupled to each other as shown. Additionally, hardware system 600 includes high performance input/output (I/O) bus 606 and standard I/O bus 608. Host bridge 610 couples processor 602 to high performance (I/O) bus 606, whereas (I/O) bus bridge 612 couples the two buses 606 and 608 to each other. Coupled to bus 606 are network/communication interface 624, system memory 614, and video memory 616. In turn, display device 618 is coupled to video memory 616. Coupled to bus 608 is mass storage 620, keyboard and pointing device 622, and I/O ports 626. Collectively, these elements are intended to represent a broad category of hardware systems, including but not limited to general purpose computer systems based on the Pentium® processor, Pentium® Pro processor, or Pentium® II processor manufactured by Intel Corporation of Santa Clara, Calif.

These elements 602–626 perform their conventional functions known in the art. In particular, network/communication interface 624 is used to provide communication between system 600 and any of a wide range of conventional networks, such as an Ethernet, token ring, the Internet, etc. It is to be appreciated that the circuitry of interface 624 is dependent on the type of network the system 600 is being coupled to.

Mass storage 620 is used to provide permanent storage for the data and programming instructions to perform the above described functions implemented in the system controller, whereas system memory 614 is used to provide temporary storage for the data and programming instructions when executed by processor 602.

I/O ports 626 are one or more serial and/or parallel communication ports used to provide communication between additional peripheral devices which may be coupled to hardware system 600. In the illustrated embodiment, communication lines 122 and 124 of FIG. 1 are coupled to hardware system 600 via I/O ports 626.

It is to be appreciated that various components of hardware system 600 may be re-arranged. For example, cache 604 may be on-chip with processor 602. Alternatively, cache 604 and processor 602 may be packed together as a "processor module", with processor 602 being referred to as the "processor core". Furthermore, certain implementations of the present invention may not require nor include all of the above components. For example, mass storage 620, keyboard and pointing device 622, and/or display device 618 and video memory 616 may not be included in system 600. Additionally, the peripheral devices shown coupled to standard I/O bus 608 may be coupled to high performance I/O bus 606; in addition, in some implementations only a single bus may exist with the components of hardware system 600 being coupled to the single bus. Furthermore, additional components may be included in system 600, such as additional processors, storage devices, or memories.

In one embodiment, the control of system controller 300 of FIG. 3 as discussed above is implemented as a series of software routines run by hardware system 600 of FIG. 6. These software routines comprise a plurality or series of instructions to be executed by a processor in a hardware system, such as processor 602 of FIG. 6. Initially, the series of instructions are stored on a storage device, such as mass storage 620. It is to be appreciated that the series of instructions can be stored on any conventional storage medium, such as a diskette, CD-ROM, magnetic tape, DVD, laser disk, ROM, etc. It is also to be appreciated that the series of instructions need not be stored locally, and could be received from a remote storage device, such as a server on a network, via network/communication interface 624.

The instructions are copied from the storage device, such as mass storage 620, into memory 614 and then accessed and executed by processor 602. In one implementation, these software routines are written in the C++ programming language. It is to be appreciated, however, that these routines may be implemented in any of a wide variety of programming languages. In alternate embodiments, the present invention is implemented in discrete hardware or firmware. For example, an application specific integrated circuit (ASIC) could be programmed with the above described functions of the present invention.

In the discussions above, reference is made to signals being transmitted from a remote control device to a reception device. In an alternate embodiment, users provide voice commands to the reception device. Thus, rather than issuing a particular command by selecting a button on a remote control device, a user can make a request by voicing the command, such as by uttering the phrase "power on television". In this embodiment, reception device 200 of FIG. 2 and/or system controller 300 of FIG. 3 includes conventional speech recognition hardware and/or software to recognize the various commands.

Also in the discussions above, reference is made to selecting buttons on a remote control device to request particular functions. In alternate embodiments, different interfaces can be used, such as a touch screen or pointing devices (e.g., trackball) and corresponding displays.

Also in the discussions above, reference is made to controlling components in particular rooms. It is to be appreciated that the result of a particular function of a component in a particular room may be seen and/or heard in that particular room or another room. By way of example, a pair of speakers in bedroom 106 of FIG. 1 may actually be driven by a tuner/amplifier in a separate audio/video room (not shown). However, when a user requests activation of the speakers via a remote control device in bedroom 106, system controller sends a command to the tuner/amplifier to turn on the speakers in bedroom 106.

Thus, the present invention provides an addressable distributed wireless remote control system. Requests are received by distributed wireless reception devices and a device identifier is advantageously forwarded to a system controller along with an identifier of the request. Thus, the location of a user when a particular request is made can be readily ascertained by the system controller and acted upon accordingly based on the reception device identifier.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising:

receiving with a wireless reception device a command for an audio/visual component from a remote control device;

determining a receiver identifier corresponding to the wireless reception device;

transmitting the command and the receiver identifier to a controller in response to receiving the command; and transmitting a control sequence generated by the controller to the audio/visual component, to control the audio/visual component.

2. The method of claim 1 wherein the wireless reception device and the audio/visual component comprise a single device.

3. The method of claim 1 wherein the receiver identifier indicates a location of the wireless reception device.

4. The method of claim 1 wherein the wireless reception device and the controller comprise a single device.

5. An article comprising a machine-readable medium having stored thereon sequences of instructions that, when executed, cause one or more electronic systems to:

receive with a wireless reception device a command for an audio/visual component from a remote control device;

determine a receiver identifier corresponding to the wireless reception device;

transmit the command and the receiver identifier to a controller in response to receiving the command; and transmit a control sequence generated by the controller to the audio/visual component, to the audio/visual component.

6. The article of claim 5 wherein the wireless reception device and the audio/visual component comprise a single device.

7. The article of claim 5 wherein the receiver identifier indicates a location of the wireless reception device.

8. The article of claim 5 wherein the wireless reception device and the controller comprise a single device.

9. A method comprising:

receiving a command for an audio/visual component and a receiver identifier of a wireless reception device that received the command;

generating a control sequence in response to the command and the receiver identifier; and transmitting the control sequence to the audio/visual component.

10. The method of claim 9 wherein the wireless reception device and the audio/visual component comprise a single device.

11. The method of claim 9 further comprising determining a location of the audio/visual component.

12. The method of claim 11 further comprising determining a location of a device to be controlled by the control sequence.

13. The method of claim 9 further comprising determining a location of the audio/visual component.

14. An article comprising a machine-readable medium having stored thereon sequences of instructions that, when executed cause one or more electronic systems to:

receive a command for an audio/visual component and a receiver identifier of a wireless reception device that received the command;

generate a control sequence in response to the command and the receiver identifier; and transmit the control sequence to the audio/visual component.

15. The article of claim 14 wherein the wireless reception device and the audio/visual component comprise a single device.

16. The article of claim 14 further comprising sequences of instructions that, when executed, cause the one or more electronic systems to determine a location of the wireless reception device.

17. The article of claim 16 further comprising sequences of instructions that, when executed, cause the one or more electronic systems to determine a location of the audio/visual component to be controlled by the control sequence.

18. An apparatus comprising:

a wireless receiving device to receive a command for an audio/visual component from a wireless remote control device, the wireless receiving device having an associated receiver identifier;

a controller coupled with the wireless reception device, the controller to receive the command and the receiver identifier from the wireless receiving device and to transmit a control sequence in response to the command and the receiver identifier;

an audio/visual component coupled with the controller to receive the control sequence from the controller and to perform a function indicated by the control sequence.

19. The apparatus of claim 18 wherein the wireless reception device and the audio/visual component comprise a single device.

20. The apparatus of claim 18 wherein the receiver identifier indicates a location of the wireless reception device.

21. The apparatus of claim 18 wherein the wireless reception device and the controller comprise a single device.

* * * * *